US011473688B2

(12) United States Patent
Ha et al.

(10) Patent No.: US 11,473,688 B2
(45) Date of Patent: Oct. 18, 2022

(54) VALVE APPARATUS

(71) Applicant: INZICONTROLS CO., LTD., Siheung-si (KR)

(72) Inventors: Seung Chan Ha, Suwon-si (KR); Jae Min Ryu, Incheon (KR); Jun Ho Jang, Incheon (KR)

(73) Assignee: INZICONTROLS CO., LTD., Siheung-si (KR)

( * ) Notice: Subject to any disclaimer, the term of this patent is extended or adjusted under 35 U.S.C. 154(b) by 8 days.

(21) Appl. No.: 17/083,881

(22) Filed: Oct. 29, 2020

(65) Prior Publication Data

US 2022/0082175 A1 Mar. 17, 2022

(30) Foreign Application Priority Data

Sep. 14, 2020 (KR) .................. 10-2020-0117485

(51) Int. Cl.
*F16K 27/06* (2006.01)
*F16K 5/04* (2006.01)
*F16K 11/20* (2006.01)
*F01P 7/14* (2006.01)

(52) U.S. Cl.
CPC .......... *F16K 27/065* (2013.01); *F16K 5/0407* (2013.01); *F01P 2007/146* (2013.01); *F16K 11/205* (2013.01)

(58) Field of Classification Search
CPC .... F16K 5/0407; F16K 5/0471; F16K 5/0207; F16K 5/0271; F16K 5/0605; F16K 5/0689; F16K 11/205; F16K 11/24; F16K 27/065; F16K 27/067
See application file for complete search history.

(56) References Cited

U.S. PATENT DOCUMENTS

| 1,856,380 | A | * | 5/1932 | Foster | F16K 11/205 137/597 |
| 4,276,905 | A | * | 7/1981 | Lourdeaux | F16K 27/067 137/613 |
| 2016/0377187 | A1 | * | 12/2016 | Henwood | F16K 27/067 251/315.1 |

FOREIGN PATENT DOCUMENTS

| KR | 10-1500391 B1 | 3/2015 |
| KR | 10-2017-0136506 A | 12/2017 |

* cited by examiner

*Primary Examiner* — Hailey K. Do
(74) *Attorney, Agent, or Firm* — Sughrue Mion, PLLC

(57) ABSTRACT

Disclosed is a valve apparatus, including: one housing where a fluid is introduced and discharged; a first valve part provided inside the housing and configured to control flow of the fluid; a second valve part provided inside the housing such that the fluid is introduced into the second valve part from the first valve part, and configured to control flow of the fluid introduced from the first valve part; and a connection part configured to introduce the fluid discharged from the first valve part in the housing into the second valve part, wherein respective valve shaft directions of the first and second valve parts respectively are non-parallel to each other, and any one of respective valve shafts of the first and second valve parts is parallel to an axial direction of the connection part. In accordance with such a configuration, a plurality of valve parts having different axial directions can be seated in one housing to be connected to each other, so that manufacturability and valve control efficiency can be improved.

9 Claims, 3 Drawing Sheets

【FIG. 1】
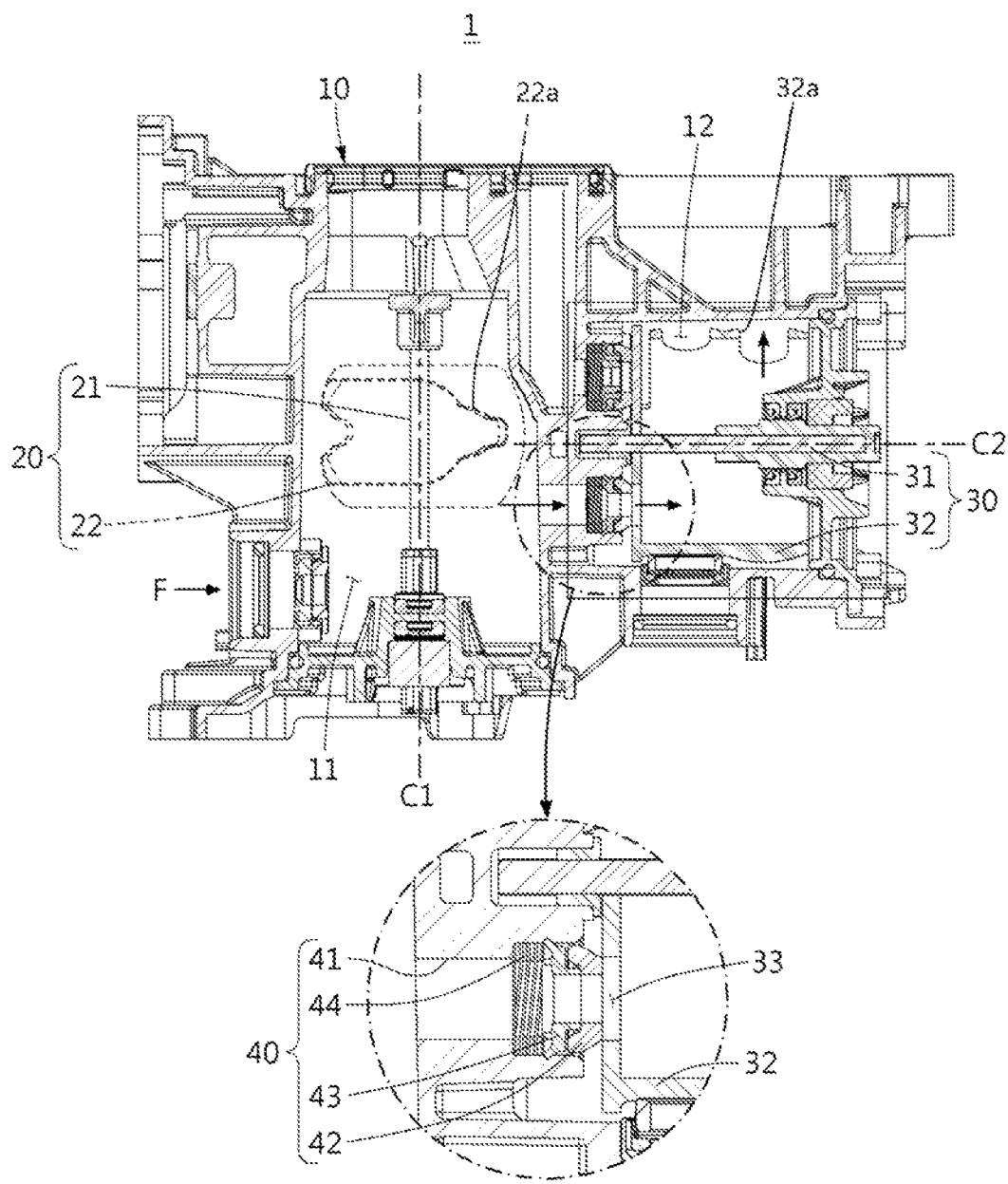

【FIG. 2】
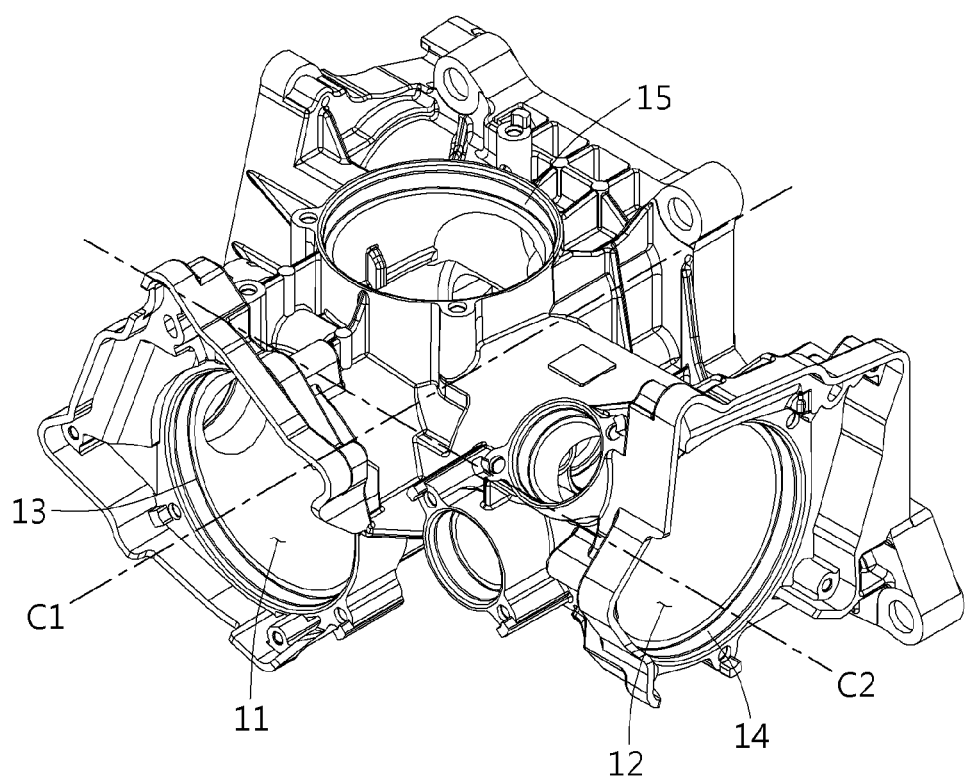

[FIG. 3]
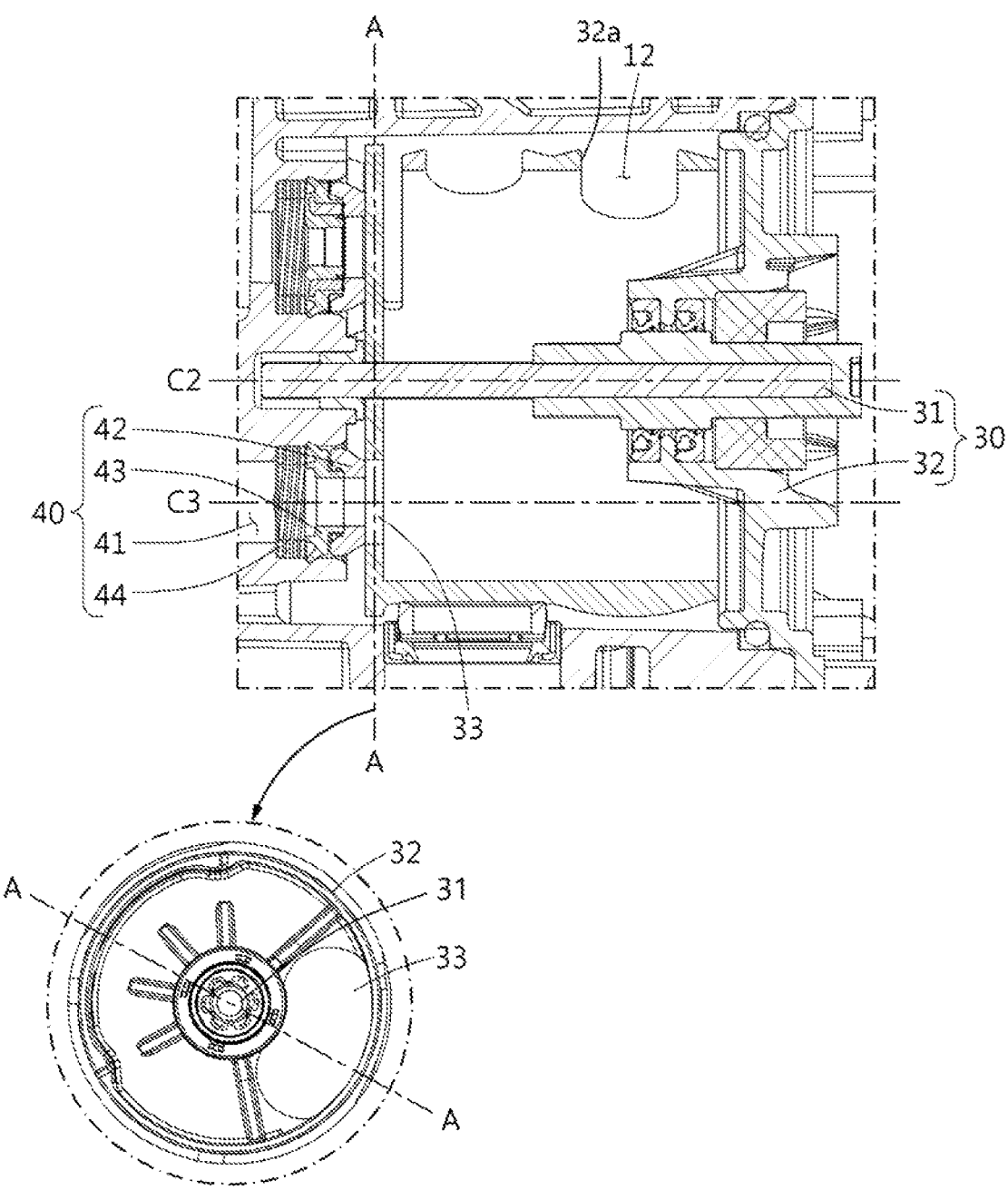

VALVE APPARATUS

CROSS-REFERENCE TO RELATED APPLICATION

This application claims the priority benefit of Korean Patent Application No. 10-2020-0117485, filed on Sep. 14, 2020, in the Korean Intellectual Property Office, the disclosure of which is incorporated herein by reference.

BACKGROUND OF THE DISCLOSURE

Field of the Disclosure

The present disclosure relates to a valve apparatus, and more particularly, to a valve apparatus including one injection-molded housing and a plurality of valves having different axial directions mounted in the housing.

Description of the Related Art

Vehicles driven by an internal combustion engine are equipped with various types of valves thereinside. These valves are configured to distribute, control, or regulate various types of fluid flow according to applications such as engine cooling, indoor space cooling/heating, and exhaust gas recirculation (EGR). In particular, a control valve mounted in vehicles is sometimes provided as a multi-valve to control the flow of coolant, which circulates inside and outside an engine, in multiple directions.

Meanwhile, a control valve mounted in vehicles directly affects the performance of a vehicle engine by changing the direction of coolant or adjusting a flow rate. Accordingly, various research into improving the performance of a vehicle control valve to improve the safety driving performance of a vehicle is underway in recent years.

RELATED ART DOCUMENTS

Patent Documents

Korean Patent Application Publication No. 10-2017-0136506
Korean Patent No. 10-1500391

SUMMARY OF THE DISCLOSURE

Therefore, the present disclosure has been made in view of the above problems, and it is an object of the present disclosure to provide a valve apparatus including one housing manufactured through one injection molding process and a plurality of valves having different axial directions mounted in the housing, thus having improved manufacturability.

In accordance with an aspect of the present invention, the above and other objects can be accomplished by the provision of a valve apparatus, including: one housing where a fluid is introduced and discharged; a first valve part provided inside the housing and configured to control flow of the fluid; a second valve part provided inside the housing such that the fluid is introduced into the second valve part from the first valve part, and configured to control flow of the fluid introduced from the first valve part; and a connection part configured to introduce the fluid discharged from the first valve part in the housing into the second valve part, wherein respective valve shaft directions of the first and second valve parts respectively are non-parallel to each other, and any one of respective valve shafts of the first and second valve parts is parallel to an axial direction of the connection part.

In addition, the first and second valve parts may be coupled to the housing in first and second axial directions non-parallel to each other, respectively, and the connection part is provided in the housing in a third axial direction at a position spaced apart from the second axis while being parallel to the second axis, and the housing may be injection-molded to have spaces, in which the first and second valve parts and the connection part are to be disposed, by using a first sliding core introduced and separated in the first axial direction and a second sliding core introduced and separated in the second and third axial directions.

In addition, the first valve part may rotate with respect to a first valve shaft to control flow of the fluid, the second valve part rotates with respect to a second valve shaft perpendicular to the first valve shaft to control flow of the fluid, and the connection part may be provided in a direction parallel to the second valve shaft.

In addition, the housing may be injection-molded to include first and second seating spaces where the first and second sliding cores are respectively introduced and separated in the first and second axial directions coaxial with the first and second valve shafts and the first and second valve parts are to be seated, and the connection part may include a connection passage simultaneously injection-molded together with the second seating space by the second sliding core.

In addition, the second valve part may include: a first valve shaft; and a first valve member rotating with respect to the first valve shaft and providing a first flow path of the fluid, and the second valve part may include: a second valve shaft perpendicular to the first valve shaft; and a second valve member rotating with respect to the second valve shaft and providing a second passage of the fluid, wherein the connection part may be provided in an axial direction parallel to the second valve shaft at a position spaced apart from the second valve shaft.

In addition, the connection part may include: a connection passage provided to communicate spaces of the first and second valve parts with each other; a valve seat interposed on an outlet side of the connection passage facing the second valve part and configured to have a hollow shape so as not to interfere with the fluid passing through the connection passage; a sealing member provided to have a hollow shape to be in close contact with the valve seat and configured to seal the connection passage against the housing; and an elastic member configured to elastically press the sealing member and the valve seat in the connection passage toward the second valve part, wherein the connection passage is provided to be parallel to the second valve shaft of the second valve part.

In addition, the second valve member may include a connection hole formed at a position facing the connection passage, the connection hole being provided to penetrate through the second valve member so as to be selectively connected to the connection passage according to a rotational posture.

In accordance with another aspect of the present invention, there is provided a valve apparatus, including: one housing configured to include first and second seating spaces that are provided in first and second axial directions perpendicular to each other, a fluid being introduced into and discharged from the housing; a first valve part seated in the first seating space and configured to rotate with respect to a first valve shaft parallel to the first axis to control flow of the fluid; a second valve part seated in the second seating space and configured to rotate with respect to a second valve shaft parallel to the second axis to control flow of the fluid; and a connection part provided to introduce the fluid into the second valve part from the first valve part, wherein the connection part is provided in a third axial direction parallel to any one of the first and second axes.

In addition, the housing may be injection-molded to have the first and second seating spaces by using a first sliding core introduced and separated in the first and second axial directions and a second sliding core introduced and separated in the second and third axial directions, and the connection part may include a connection passage simultaneously injection-molded together with the second seating space by the second sliding core.

In addition, the third axis may be formed to be spaced apart from the second axis by a predetermined distance, and a connection hole selectively connected to the connection passage may be formed to penetrate through one side of the second valve part and configured to selectively connect the connection hole and the connection passage to each other according to a rotational posture with respect to the second valve shaft.

In addition, the connection part may include a connection passage provided to communicate spaces of the first and second valve parts with each other; a valve seat interposed on an outlet side of the connection passage facing the second valve part and configured to have a hollow shape so as not to interfere with the fluid passing through the connection passage; a sealing member provided to have a hollow shape to be in close contact with the valve seat and configured to seal the connection passage against the housing; and an elastic member configured to elastically press the sealing member and the valve seat in the connection passage toward the second valve part, wherein the connection passage is provided to be parallel to the second valve shaft of the second valve part.

In addition, the second valve member may include a connection hole formed at a position facing the connection passage, the connection hole being provided to penetrate through the second valve member so as to be selectively connected to the connection passage according to a rotational posture.

BRIEF DESCRIPTION OF THE DRAWINGS

The above and other objects, features and other advantages of the present disclosure will be more clearly understood from the following detailed description taken in conjunction with the accompanying drawings, in which:

FIG. 1 is a sectional view schematically illustrating a valve apparatus according to a preferred embodiment of the present disclosure;

FIG. 2 is a perspective view schematically illustrating a housing of the valve apparatus illustrated in FIG. 1; and FIG. 3 illustrates a schematically enlarged sectional view of a main portion between a second valve part and a connection part illustrated in FIG. 1 to describe a connection relationship therebetween.

DETAILED DESCRIPTION OF THE DISCLOSURE

Hereinafter, the present invention will be described in detail by explaining preferred embodiments of the invention with reference to the attached drawings. However, it should be understood that the spirit and scope of the present disclosure are not limited to the embodiments and can be modified by addition, modification, or deletion of elements constituting the embodiments and such additions, modifications, and deletions are also within the spirit and scope of the present disclosure.

FIG. 1 is a sectional view schematically illustrating a valve apparatus 1 according to a preferred embodiment of the present disclosure. Referring to FIG. 1, the valve apparatus 1 according to a preferred embodiment of the present disclosure includes a housing 10, a first valve part 20, a second valve part 30 and a connection part 40.

For reference, the valve apparatus 1 described in the present disclosure may be applied to an air switch valve, a coolant switch valve, an oil valve, etc. that control the flow of fluid or gas. In the embodiment, the valve apparatus 1 is illustrated and exemplified as a coolant switch valve that is connected to a vehicle engine E and serves to control the flow of coolant, but the present disclosure is not naturally limited thereto.

A fluid F is introduced into and is discharged from the housing 10. The housing 10 has a space therein as shown in FIG. 2. The housing 10 having a space may be formed through injection molding. More particularly, the first valve part 20 and the second valve part 30 are provided inside the housing 10 and are formed as one housing body through plastic injection molding. The first valve part 20 is seated on one side of the housing 10, the second valve part 30 is seated on another side of the housing 10, and the connection part 40 configured to connect the first and second valve parts 20 and 30 to each other is provided inside the housing 10.

For this, a first seating space 11, where the first valve part 20 is to be seated, is provided on one side of the housing 10, and a second seating space 12, where the second valve part 30 is to be seated, is provided on another side of the housing 10, as shown in FIG. 2. Here, the first seating space 11 communicates with a first seating hole 13 that penetrates through one side of the housing 10, and the second seating space 12 communicates with a second seating hole 14 that penetrates through another side of the housing 10.

The first and second seating spaces 11 and 12 are respectively provided in the directions of first and second axes C1 and C2, as shown in FIG. 2. Here, the first and second axes C1 and C2 are provided so as not to be parallel to each other, more preferably, are provided to be perpendicular to each other. The first and second valve parts 20 and 30, which are described below, are respectively introduced into and seated on the first and second seating spaces 11 and 12 in the directions of the first and second axes C1 and C2.

Meanwhile, the housing 10 is made of a thermoplastic resin, such as plastic, which can be processed by injection molding. In addition, upon injection molding of the housing 10, first and second sliding cores (not shown) for molding the first and second seating spaces 11 and 12 slidingly enter in the directions of the first and second axes C1 and C2. When the injection molding is completed, the first and second sliding cores (not shown) are separated from the housing 10. Here, since the first and second sliding cores (not shown) may be respectively separated in the directions of the first and second axes C1 and C2, the first and second seating spaces 11 and 12 may be injection molded by only one injection-molding operation. Accordingly, the first and second seating spaces 11 and 12, where the first and second valve parts 20 and 30 are to be seated simultaneously, may be molded in one body of the housing 10, which provides excellent manufacturability.

The first valve part 20 is provided inside the housing 10 and controls the flow of the fluid F. The first valve part 20 includes a first valve shaft 21; and a first valve member 22 that rotates with respect to the first valve shaft 21 and controls the flow of the fluid F.

Although not shown in detail, the first valve member 22 is provided to have a hollow shape into which the fluid F is introduced, and at least one first valve hole 22*a*, where the fluid F is introduced and discharged, is provided to penetrate through the first valve member 22. The configuration of the first valve member 22 is not essential to the present disclosure, so detailed description and illustration thereof are omitted.

The second valve part 30 includes a second valve shaft 31 provided not to be parallel to the first valve shaft 21, and a second valve member 32 that rotates with respect to the second valve shaft 31 and controls the flow of the fluid F. As in the first valve member 22, the second valve member 32 also has a hollow body into which the fluid F is introduced, and at least one second valve hole 32*a*, where the fluid F is introduced and discharged, is formed on the outside of the second valve member 32 to penetrate through the second valve member 32.

The first and second valve parts 20 and 30 are respectively seated in the first and second seating spaces 11 and 12 of the housing 10. Here, the first and second valve shafts 21 and 31 of the first and second valve parts 20 and 30 are respectively fixed to the first and second seating spaces 11 and 12, and the first and second valve members 22 and 32 respectively enter in each axial direction through the first and second seating holes 13 and 14 to be rotatably coupled to the first and second valve shafts 21 and 31.

The connection part 40 connects the first and second valve parts 20 and 30 to each other in the housing 10. That is, the connection part 40 provides a kind of connection passage through which the fluid F discharged from the first valve part 20 is introduced into the second valve part 30. The connection part 40 is provided on a path through which the fluid F is introduced into the second valve part 30 from the first valve part 20. Selectively, the connection part 40 is provided to communicate with the second valve part 30 so that the fluid F of the first valve part 20 is introduced into the second valve part 30.

For this, the connection part 40 includes a connection passage 41, a valve seat 42, a sealing member 43 and an elastic member 44. Here, the connection passage 41, the valve seat 42, the sealing member 43 and the elastic member 44 are provided in the direction of a third axis C3 parallel to the second valve part 30 (see FIG. 3).

The connection passage 41 is provided to communicate spaces of the first and second valve parts 20 and 30 with each other. The connection passage 41 is provided at a position spaced apart from the second valve shaft 31 to extend in the direction of the third axis C3 parallel to the second valve shaft 31, thereby communicating the first and second seating spaces 11 and 12 with each other. For reference, the connection passage 41 is provided to be parallel to the second valve shaft 31 of the second valve part 30, but is provided at a position non-coaxial with the second valve shaft 31, i.e., at a position spaced apart from the second valve shaft 31.

Meanwhile, a connection hole 33 capable of communicating with the connection passage 41 is cut, and is formed to penetrate through the second valve member 32 at a position facing the connection passage 41, as shown in FIG. 3. The connection hole 33 of the second valve member 32 is selectively connected to the connection passage 41 or closed from the connection passage 41 according to a rotational posture rotated along the first valve shaft 21.

For reference, the connection hole 33 is exemplified as penetrating through a bottom surface of the second valve part 30 to be adjacent to the second valve shaft 31. As such, the connection hole 33 is provided on the bottom surface of the second valve part 30 to control the flow of the fluid F, which is advantageous in reducing the size of the second valve part 30.

The valve seat 42 is interposed on an outlet side of the connection passage 41 facing the second valve part 30. Here, the valve seat 42 has a hollow shape penetrated in an axial direction, thereby not interfering with the flow of the fluid F passing through the connection passage 41.

The sealing member 43 is provided to be in close contact with the valve seat 42 to seal the connection passage 41 against the housing 10 such that the fluid F does not leak. The sealing member 43 has a hollow shape not to interfere with the flow of the fluid F passing through the connection passage 41, like the valve seat 42, and is formed to be in close contact with the valve seat 42.

The elastic member 44 elastically presses the sealing member 43 and valve seat 42 of the connection passage 41 toward the second valve part 30. For reference, the valve seat 42, the sealing member 43 and the elastic member 44 are sequentially interposed, based on a position facing the second valve part 30, on the outlet side of the connection passage 41. Accordingly, the connection passage 41 and the connection hole 33 may be selectively connected to each other according to a rotational posture of the second valve member 32 due to the elastic member 44 that elastically presses the valve seat 42 and the sealing member 43 toward the second valve part 30.

Meanwhile, the first and second seating spaces 11 and 12 are injection-molded in the housing 10 by the first and second sliding cores (not shown), as described above. Here, the second valve part 30 and connection passage 41 parallel to a second axis C2 are simultaneously injection-molded by one second sliding core (not shown). Accordingly, the first and second seating spaces 11 and 12, and the connection passage 41 for connecting the first and second seating spaces 11 and 12 to each other may be simultaneously injection-molded in one housing 10. Here, since entrance and separation directions of the first and second sliding cores (not shown) are non-parallel to each other so as not to interfere with each other, the first and second seating spaces 11 and 12 and the connection passage 41 may be simultaneously molded in one housing 10.

Now, a method of manufacturing the valve apparatus 1 according to the present disclosure including the above configuration, and an operation principle thereof are described with reference to FIGS. 1 to 3.

First, the housing 10 is injection-molded as a single body in a state in which the first and second sliding cores, which are not shown, are introduced in the directions of the first and second axes C1 and C2, as shown in FIG. 2. Here, the first seating space 11, in which the first valve part 20 having the first valve shaft 21 parallel to the first axis C1 direction is to be seated, is molded by the first sliding core (not shown). In addition, the second seating space 12, in which the second valve part 30 having the second valve shaft 31 parallel to the second axis C2 direction is to be seated, and the connection passage 41, which is to be formed in the direction the third axis C3 parallel to the second axis C2 direction, are simultaneously molded by the second sliding core (not shown), as shown in FIGS. 2 and 3. That is, the second seating space 12 for formation of the second valve part 30 and the connection part 40; and the connection passage 41 which have axial directions parallel to each other are simultaneously injection-molded by only the second sliding core (not shown).

For reference, the first axis C1 of the housing 10 is illustrated as being coaxial with a first valve shaft 21, and the second axis C2 is illustrated as being coaxial with the second valve shaft 31, as shown in FIG. 3. In addition, the third axis C3, in which the connection passage 41 extends in the housing 10, is spaced apart from the second axis C2 by a predetermined distance to be parallel to the second axis C2.

Meanwhile, when the molding of the first and second seating spaces 11 and 12 is completed, the first and second sliding cores (not shown) are separated. Here, since the first and second sliding cores (not shown) can be respectively introduced and separated in the directions of the first and second axes C1 and C2 perpendicular to each other, the housing 10 can be molded as a single body without separation of the housing 10 or interference between the first and second sliding cores (not shown).

As such, when the first and second seating spaces 11 and 12 are provided in the single housing 10, the first and second valve parts 20 and 30 are respectively seated in the first and second seating spaces 11 and 12. In addition, the valve seat 42, sealing member 43 and elastic member 44 constituting the connection part 40 are interposed in the connection passage 41, so that the valve apparatus 1 is assembled.

The valve apparatus 1 is disposed on a path of the fluid F that includes coolant circulating between an engine (not shown) and a radiator (not shown), so that the fluid F is introduced into the valve apparatus 1. The flow of the introduced fluid F is controlled by the first valve part 20. Here, as the first valve member 22 rotates with respect to the first valve shaft 21, the fluid F is selectively introduced into the second valve part 30 through the connection part 40.

Here, the connection part 40 induces the flow of the fluid F, introduced through the connection passage 41, to the second valve part 30 in an interlocking manner with rotation of the second valve part 30. More particularly, the connection hole 33, which is formed to penetrate through one side of the second valve member 32 facing the connection passage 41, selectively opens or close the connection passage 41 as the second valve member 32 of the second valve part 30 rotates with respect to the second valve shaft 31, as shown in FIG. 3.

Here, since the valve seat 42 and sealing member 43 of the connection part 40 are elastically pressed toward the second valve member 32 by the elastic member 44, the connection part 40 is in a state of being pressurized toward the second valve part 30. Accordingly, when the second valve member 32 rotates so that the connection hole 33 and the connection passage 41 are connected to each other, the valve seat 42 and the sealing member 43 are in close contact with the connection hole 33 by elastic force of the elastic member 44 so that the fluid F can be smoothly introduced into the second valve member 32 without leaking. As such, the flow of the fluid F introduced into the second valve member 32 through the connection passage 41 connected to the connection hole 33 is controlled by rotation of the second valve member 32.

In accordance with the present disclosure having the above configuration, a connection passage for connecting a plurality of valve parts having different axial directions to each other is provided to be parallel to an axial direction of any one of the plural valve parts, so that spaces, in which the valve parts are to be seated, and the connection passage can be simultaneously injection-molded using only one sliding core. Accordingly, a housing can be injection-molded as a single body by using a plurality of sliding cores for forming seating spaces, in which the plural valve parts having different axial directions are to seated, without interference between the sliding cores, i.e., without penetrating each other.

In addition, since a plurality of seating spaces, in which the plurality valve parts are to be seated, are simultaneously injection-molded, it is unnecessary to separate a housing, which provides excellent manufacturability.

In addition, since the connection passage and the valve parts can be selectively operated to communicate with each other in an interlocking manner with rotation operations of the valve parts that have axes parallel to the connection passage, it is simple to constitute a valve apparatus, and excellent fluid flow control efficiency is provided.

Further, since a second valve part can control the flow of a fluid through a connection hole that penetrates through a bottom surface adjacent to a second valve shaft, the size of the second valve part can be reduced. Accordingly, a compact valve apparatus including a plurality of valve parts can be provided, which is advantageous in terms of space efficiency.

While the present invention has been described referring to the preferred embodiments, those skilled in the art will appreciate that many modifications and changes can be made to the present invention without departing from the spirit and essential characteristics of the present invention.

What is claimed is:

1. A valve apparatus, comprising:
   one housing where a fluid is introduced and discharged;
   a first valve part provided inside the housing and configured to control flow of the fluid;
   a second valve part provided inside the housing such that the fluid is introduced into the second valve part from the first valve part, and configured to control flow of the fluid introduced from the first valve part; and
   a connection part configured to introduce the fluid discharged from the first valve part in the housing into the second valve part,
   wherein respective valve shaft directions of the first and second valve parts respectively are non-parallel to each other, and any one of respective valve shafts of the first and second valve parts is parallel to an axial direction of the connection part,
   wherein the first valve part comprises:
   a first valve shaft; and
   a first valve member rotating with respect to the first valve shaft and providing a first flow path of the fluid, and
   wherein the second valve part comprises:
   a second valve shaft perpendicular to the first valve shaft; and
   a second valve member rotating with respect to the second valve shaft and providing a second passage of the fluid, and
   wherein the connection part is provided in an axial direction parallel to the second valve shaft at a position spaced apart from the second valve shaft.

2. The valve apparatus according to claim 1, wherein the first and second valve parts are coupled to the housing in a direction of a first axis and a direction of a second axis non-parallel to each other, respectively, and the connection part is provided in the housing in a direction of a third axis at a position spaced apart from the second axis while being parallel to the second axis, and
   the housing is injection-molded to have spaces, in which the first and second valve parts and the connection part are to be disposed.

3. The valve apparatus according to claim 1, wherein the first valve part rotates with respect to the first valve shaft to control flow of the fluid, the second valve part rotates with respect to the second valve shaft perpendicular to the first valve shaft to control flow of the fluid.

4. The valve apparatus according to claim 3, wherein the housing is injection-molded to comprise first and second seating spaces where the first and second valve parts are to be seated, and
the connection part comprises a connection passage simultaneously injection-molded together with the second seating space.

5. The valve apparatus according to claim 1, wherein the connection part comprises:
a connection passage provided to communicate spaces of the first and second valve parts with each other;
a valve seat interposed on an outlet side of the connection passage facing the second valve part and configured to have a hollow shape so as not to interfere with the fluid passing through the connection passage;
a sealing member provided to have a hollow shape to be in close contact with the valve seat and configured to seal the connection passage against the housing; and
an elastic member configured to elastically press the sealing member and the valve seat in the connection passage toward the second valve part,
wherein the connection passage is provided to be parallel to the second valve shaft of the second valve part.

6. The valve apparatus according to claim 5, wherein the second valve member comprises a connection hole formed at a position facing the connection passage, the connection hole being provided to penetrate through the second valve member so as to be selectively connected to the connection passage according to a rotational posture.

7. A valve apparatus, comprising:
one housing configured to comprise first and second seating spaces that are provided in a direction of a first axis and a direction of a second axis perpendicular to each other, a fluid being introduced into and discharged from the housing;
a first valve part seated in the first seating space and configured to rotate with respect to a first valve shaft parallel to the direction of the first axis to control flow of the fluid;
a second valve part seated in the second seating space and configured to rotate with respect to a second valve shaft parallel to the direction of the second axis to control flow of the fluid; and
a connection part provided to introduce the fluid into the second valve part from the first valve part,
wherein the connection part is provided in a direction of a third axis parallel to any one of the direction of the first axis and the direction of the second axis,
wherein the housing is injection-molded to have the first and second seating spaces, and
wherein the connection part comprises a connection passage simultaneously injection-molded together with the second seating space,
wherein the third axis is formed to be spaced apart from the second axis by a predetermined distance, and
wherein a connection hole selectively connected to the connection passage is formed to penetrate through one side of the second valve part configured to selectively connect the connection hole and the connection passage to each other according to a rotational posture with respect to the second valve shaft.

8. The valve apparatus according to claim 7, wherein the connection part comprises:
the connection passage provided to communicate spaces of the first and second valve parts with each other;
a valve seat interposed on an outlet side of the connection passage facing the second valve part and configured to have a hollow shape so as not to interfere with the fluid passing through the connection passage;
a sealing member provided to have a hollow shape to be in close contact with the valve seat and configured to seal the connection passage against the housing; and
an elastic member configured to elastically press the sealing member and the valve seat in the connection passage toward the second valve part,
wherein the connection passage is provided to be parallel to the second valve shaft of the second valve part.

9. The valve apparatus according to claim 8, wherein the second valve part comprises a second valve member, and
wherein the second valve member comprises the connection hole formed at a position facing the connection passage, the connection hole being provided to penetrate through the second valve member so as to be selectively connected to the connection passage according to the rotational posture.

* * * * *